Figure 1:
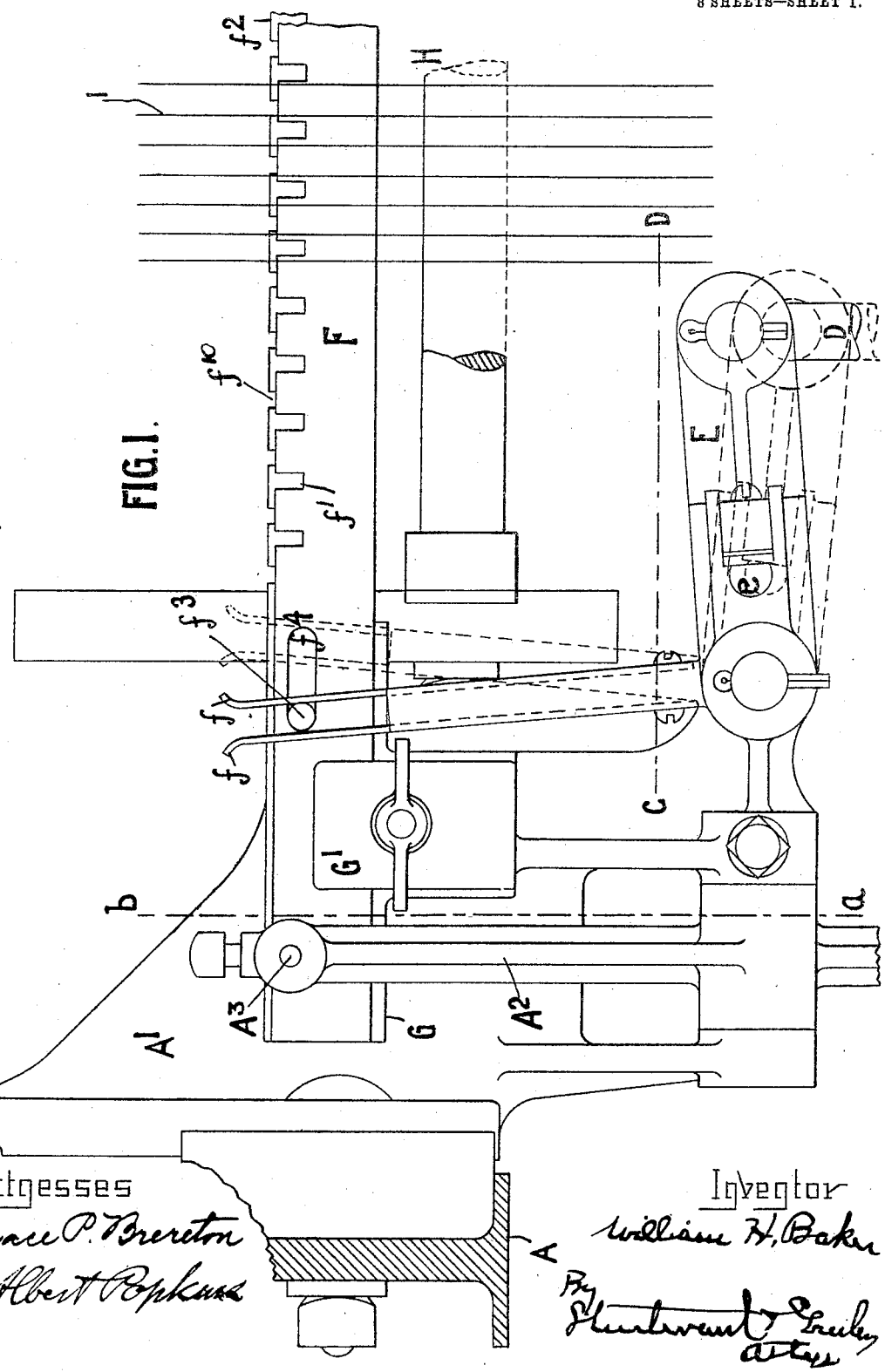

No. 796,692. PATENTED AUG. 8, 1905.
W. H. BAKER.
WARP STOP MOTION FOR LOOMS.
APPLICATION FILED MAY 22, 1903.

8 SHEETS—SHEET 1.

Witnesses
Grace P. Brereton
Albert Popkins

Inventor
William H. Baker
By Sturtevant & Finley
Attys

No. 796,692. PATENTED AUG. 8, 1905.
W. H. BAKER.
WARP STOP MOTION FOR LOOMS.
APPLICATION FILED MAY 22, 1903.

8 SHEETS—SHEET 4.

Witnesses
Grace P. Brereton.
Albert Popkins

Inventor
William H. Baker
By Sturtevant & Truley
Attys.

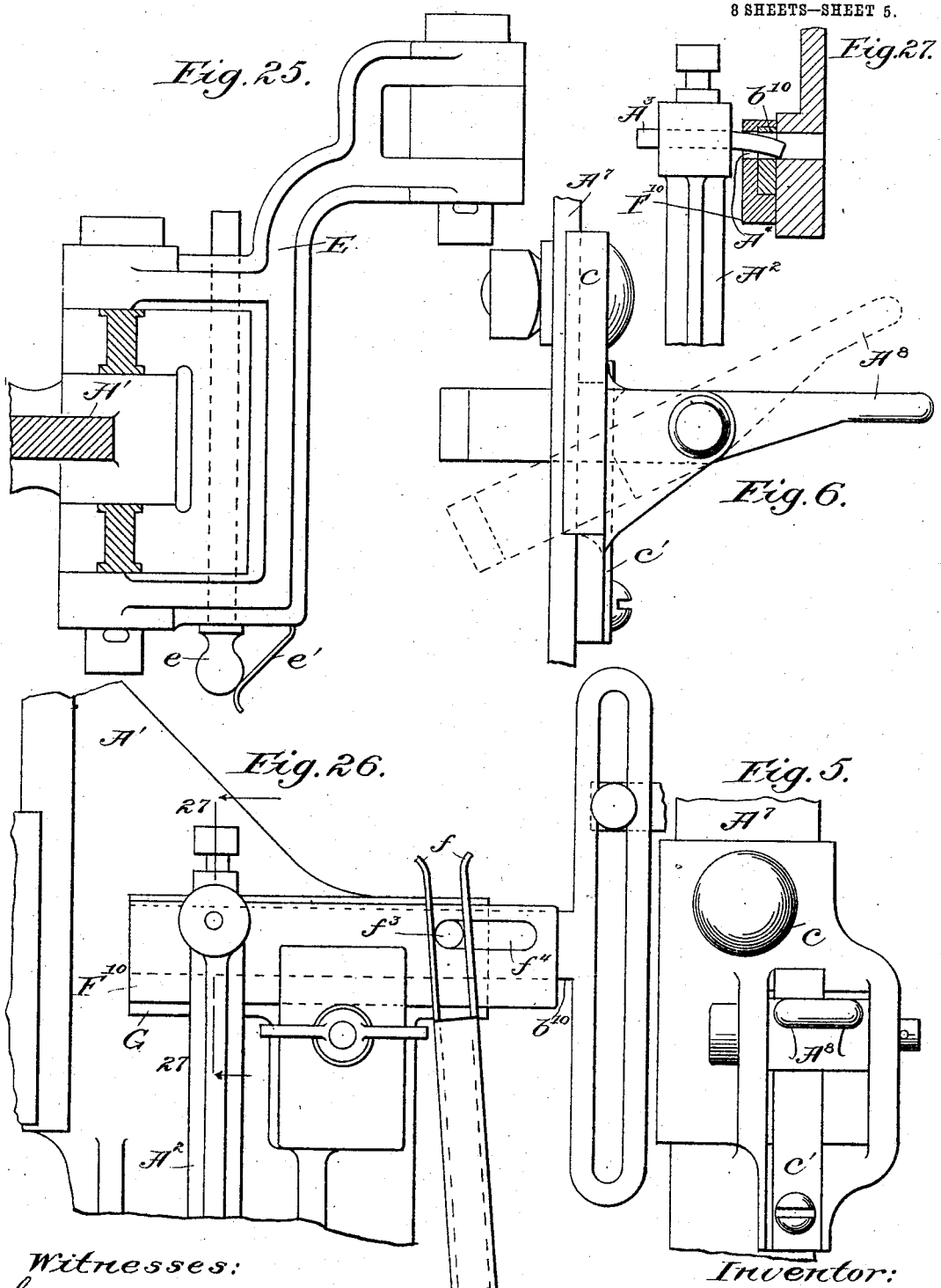

No. 796,692. PATENTED AUG. 8, 1905.
W. H. BAKER.
WARP STOP MOTION FOR LOOMS.
APPLICATION FILED MAY 22, 1903.
8 SHEETS—SHEET 6.
FIG. 17. FIG. 18. FIG. 20 FIG. 22. FIG. 24.
FIG. 19. FIG. 21. FIG. 23.
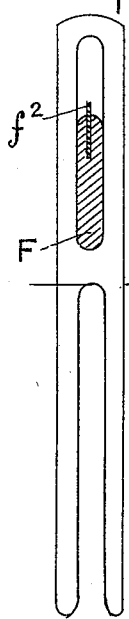
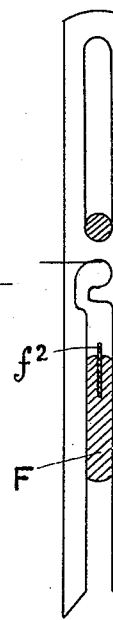
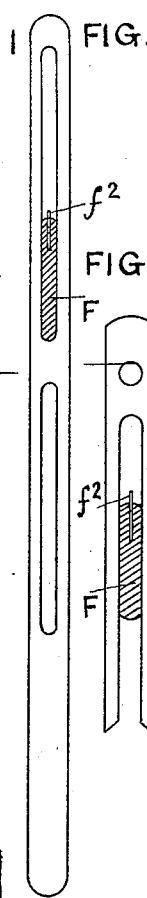
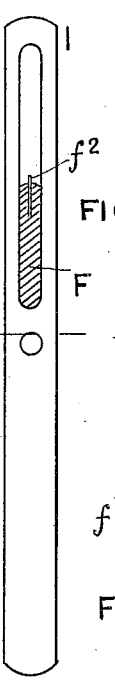
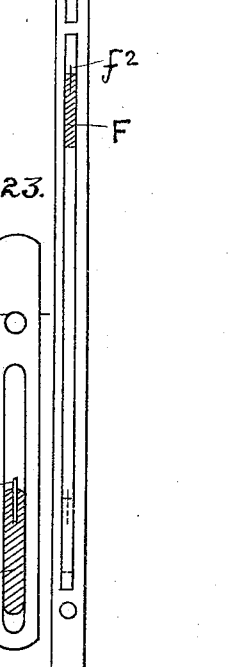
FIG. 7. FIG. 8.
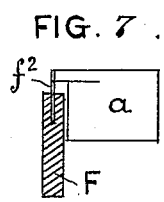
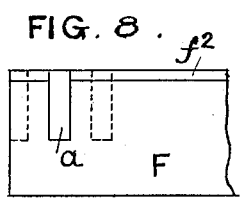
FIG. 9.
FIG. 10.
Witnesses
Grace P. Brereton
Albert Popkins
Inventor
William H. Baker
By Sturtevant & Treley
Attys

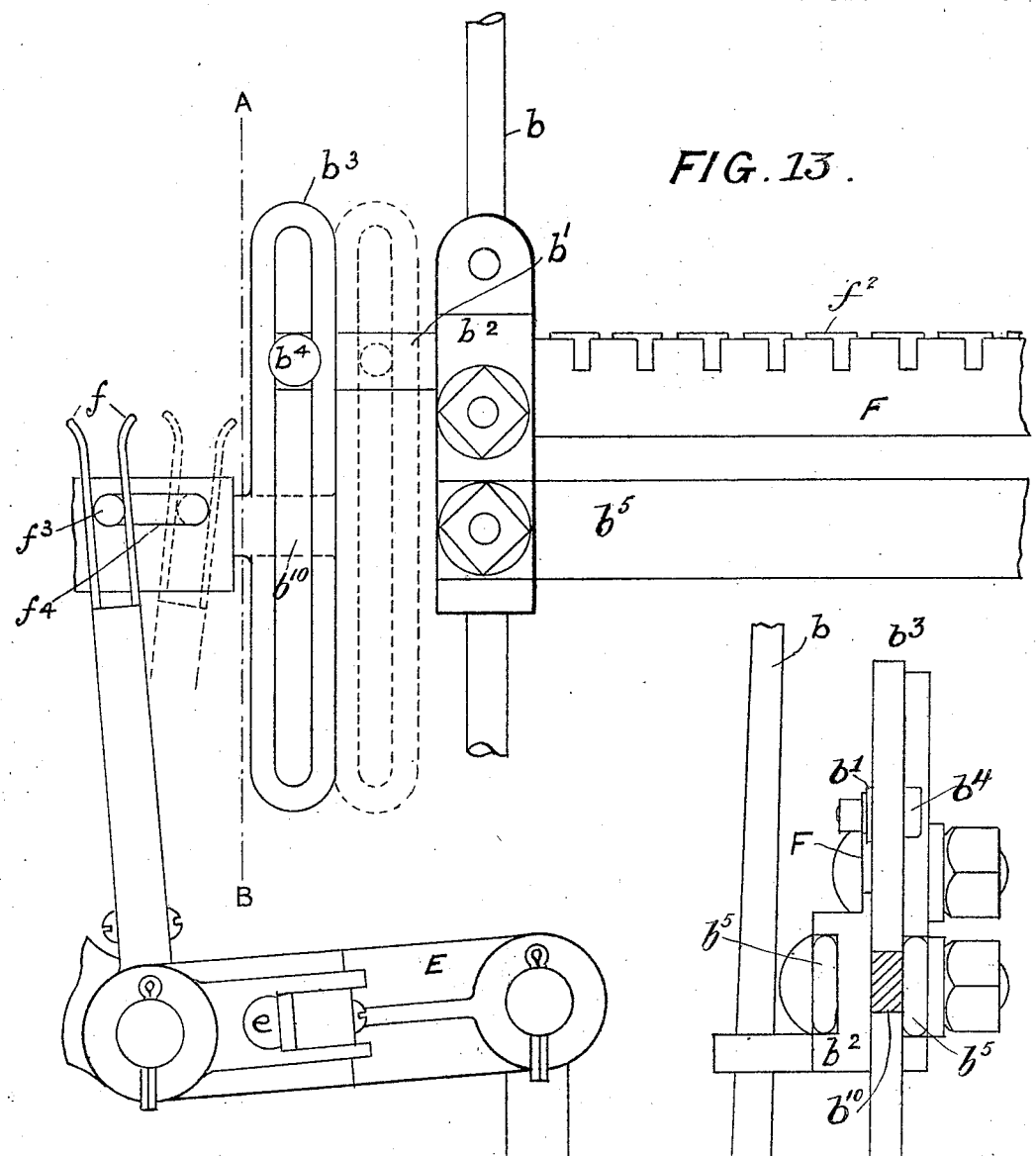

UNITED STATES PATENT OFFICE.

WILLIAM H. BAKER, OF CENTRAL FALLS, RHODE ISLAND.

WARP STOP-MOTION FOR LOOMS.

No. 796,692.   Specification of Letters Patent.   Patented Aug. 8, 1905.

Application filed May 22, 1903. Serial No. 158,305.

*To all whom it may concern:*

Be it known that I, WILLIAM HENRY BAKER, electrician, of Central Falls, in the county of Providence, in the State of Rhode Island, have invented certain new and useful Improvements in Warp Stop-Motions for Looms; and I do hereby declare that the following is a full, clear, and exact description of the same.

The present invention relates to a warp stop or indicating mechanism for looms, and has for its object to provide mechanical means for stopping the loom upon the breakage or undue slackness of a warp-thread or to indicate such an occurrence.

The invention comprises as an essential feature a reciprocating bar and a feeler, the coaction of said two elements effecting the stoppage of the loom or the setting of an indicator. These results are effected at predetermined times, in one case by interrupting the relative movement between the reciprocating bar and the feeler and causing one to impinge upon the other only when a warp-thread breaks or becomes unduly slack to thereby move a dagger into position to act upon the stopping or indicating mechanism, or by an alternative mode of operation by which such impingement occurs at each beat up of the lay to thereby move the dagger into such position that the loom will not be knocked off, the interruption of the relative movement between the reciprocating bar and feeler being effected upon the breakage or undue slackness of a warp-thread to thereby cause said bar and feeler to escape each other so as to allow the dagger to remain in its normal position to effect the stoppage of the loom. In my application, Serial No. 193,627, filed February 15, 1904, I have claimed this feature of the invention broadly. In the present application I will describe both operations, referring first to the first mode above indicated.

The above and other features of the invention will be understood by reference to the accompanying drawings, in which—

Figure 2:
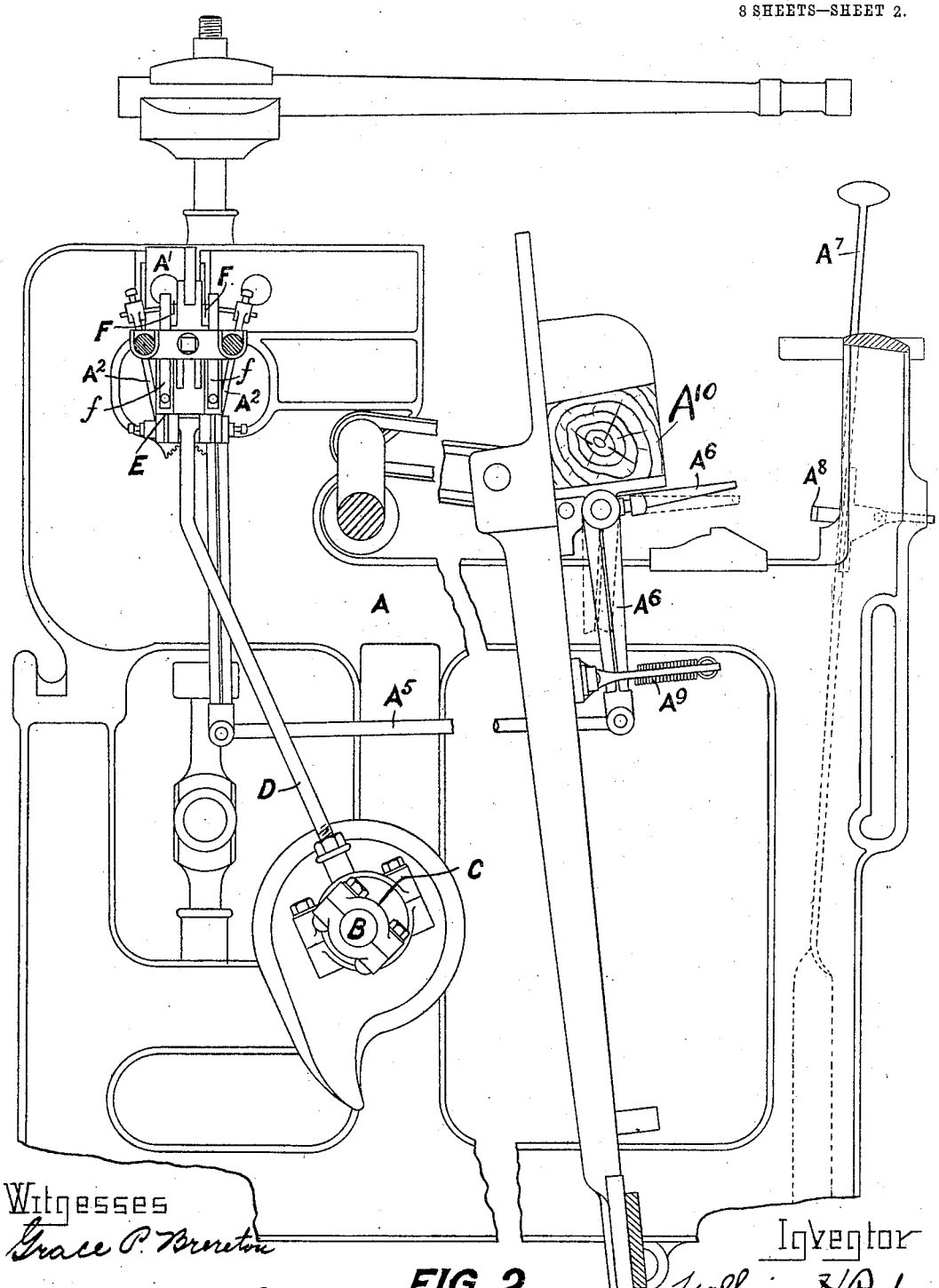
Figure 3:
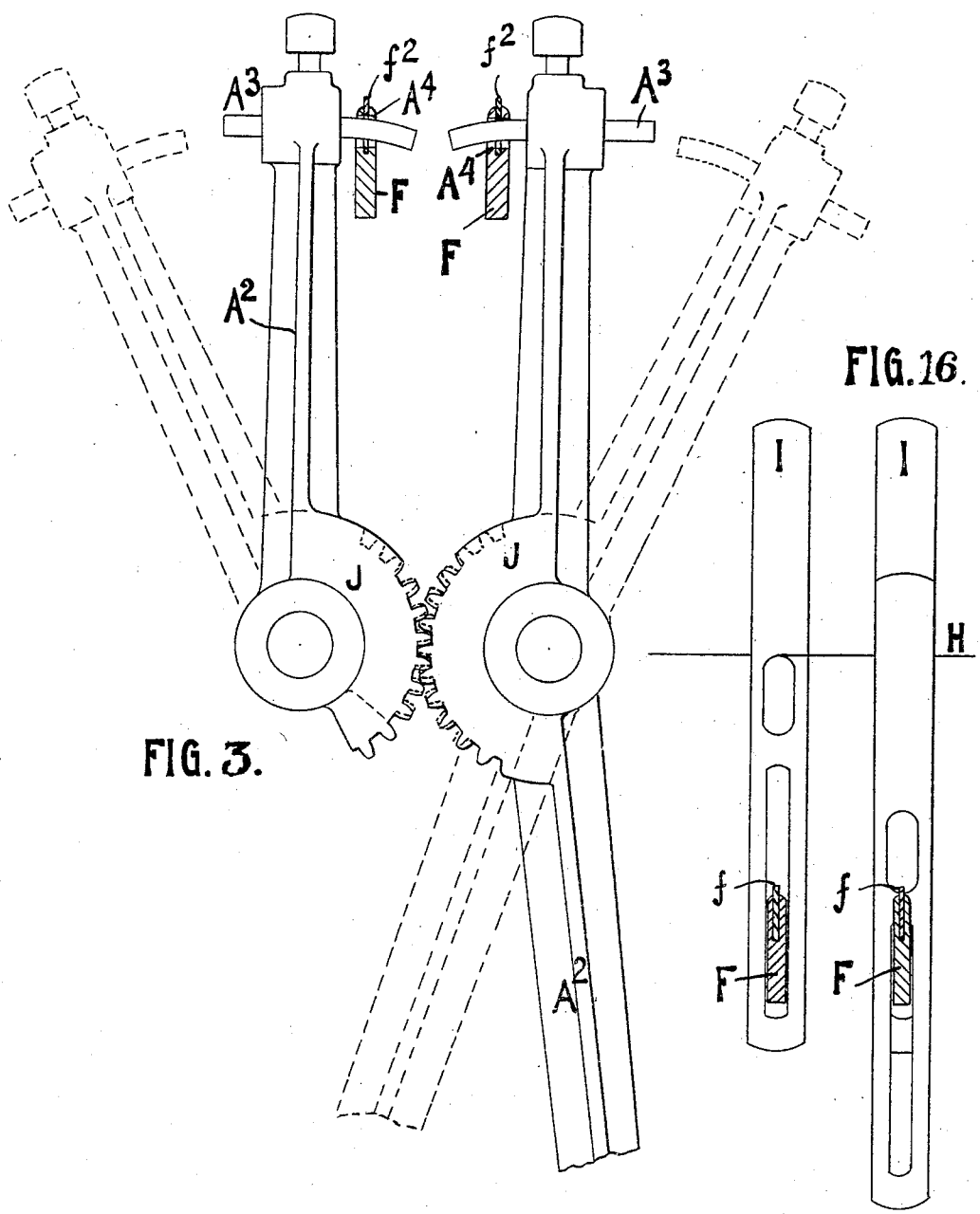
Figure 4:
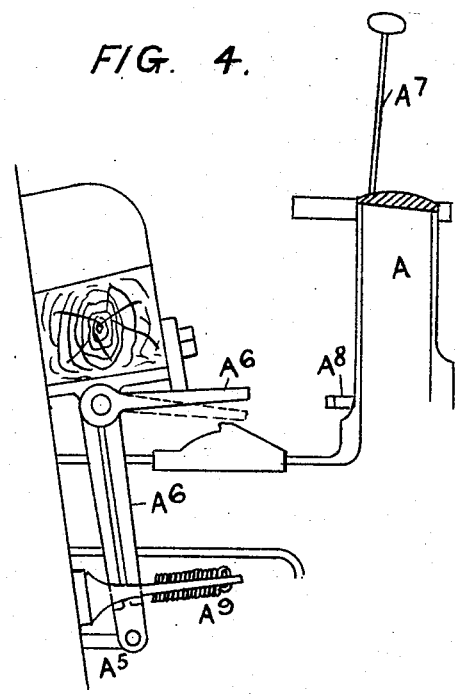
Figure 11:
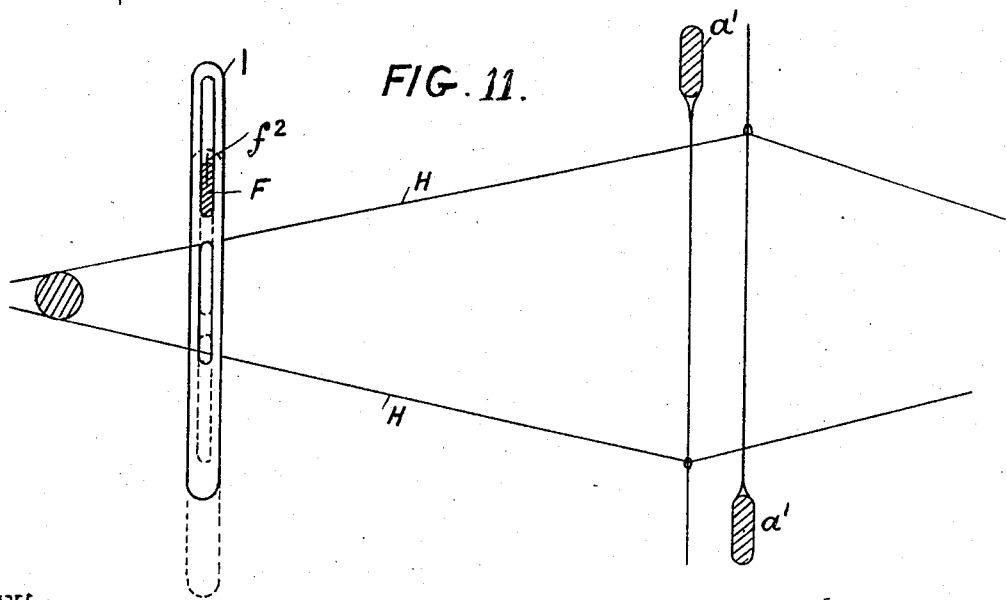
Figure 12:
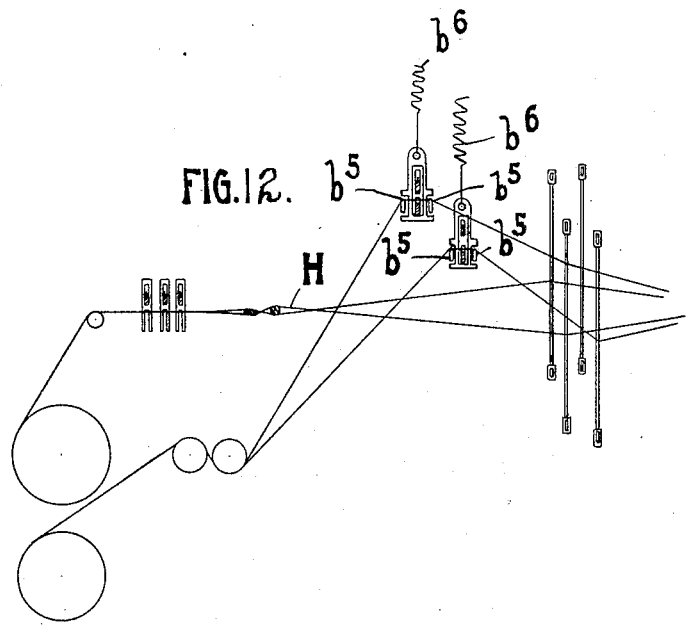
Figure 15:
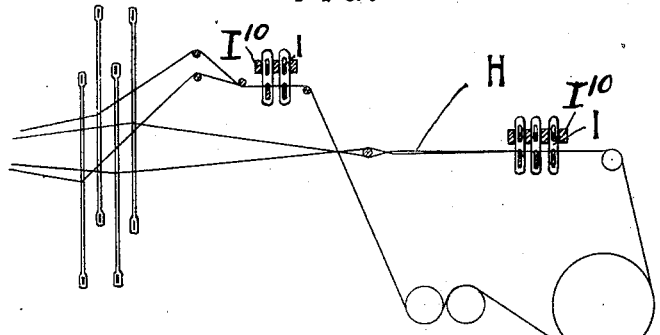

Figure 1 is a rear elevation of a portion of the loom, and Fig. 2 is a sectional elevation embodying my invention. Fig. 3 is a detail view of the feeler on the plane of the line $a\,b$ of Fig. 1. Fig. 4 is a detail view of a modification, showing the adjustment of the dagger so as to come normally in the path of the shipper-lever. Figs. 5 and 6 are enlarged detail views of the tappet. Figs. 7 and 8 illustrate modifications of the slide-bar, which coacts with the feeler. Fig. 9 is a modified form of construction of the feeler-levers. Fig. 10 is a detail view, showing the invention as applied to an indicator. Fig. 11 is a detail view, on an enlarged scale, showing the application of a single drop or detector operated by one or more threads. Fig. 12 is a diagrammatic view showing the stop-motion as applied to "floating" threads with drops adapted to rise and fall. Fig. 13 is a rear elevation of a portion of the loom, on an enlarged scale, of Fig. 12. Fig. 14 is a detail sectional elevation of a portion of Fig. 13. Fig. 15 is a modification of the arrangement shown in Fig. 12, in which the stop-motion is applied to the floating threads with stationary contact-bars. Figs. 16, 17, 18, 19, 20, 21, 22, 23, and 24 show various forms of drops or detectors used either above or below the warp. Fig. 25 is a sectional plan view on the plane of the line C D of Fig. 1. Fig. 26 is an elevation of a part of Fig. 13, showing an extension which coöperates with the feeler similar to Fig. 1; and Fig. 27 is a vertical section view on the plane of the line 27 27 of Fig. 26.

Similar letters of reference indicate similar parts in the several views.

Referring to the drawings, the loom-frame A, the belt-shipper lever $A^7$, and the lay $A^{10}$ are and may be all as common in looms. The drops or indicators I herein described may be arranged in any desired number of groups, breakage or undue slackness of a warp-thread in any group effecting the stoppage of the loom. For that purpose the shipper-lever $A^7$ is provided with a tappet $A^8$, adapted to be impinged upon by a dagger $A^6$, Fig. 2, when the latter is brought into operative position through the following instrumentalities. On a suitable shaft B is a cam or eccentric C, to which is connected a rod D, said rod adapted to actuate a bell-crank lever E. The lever E is preferably made in two parts, held together by means of a pin $e$, as fully described in my said application, Serial No. 193,627, and as shown in Fig. 25. One arm of the lever E extends upwardly and is provided with one or more sets of resilient spring forks or arms $f$, adapted to embrace or engage a pin $f^3$ on a bar $f^2$. Fastened to the loom-frame by means of sockets G and clamps G' is a supporting-frame F, made with a longitudinal groove, the side walls of which are provided with serrations or notches $f'$. The bar $f^2$, of steel or other suitable material, is slidably supported in and projects slightly above the support F, and its upper edge is also formed with serrations $f^{10}$, as shown in Fig. 1. The pin $f^3$ on the bar $f^2$ projects through a slot $f^4$ in the side wall of the support F, so as to be held in engagement with the spring arms or fork $f$, from which it will be readily seen that as the shaft B is rotated the rod D, acting through the spring arms or fork $f$, will cause the serrated bar $f^2$ to be reciprocated in the groove of the support F. In practice the warp-threads will be led from the beam through the eyes of the usual heddles or harnesses and separated by lease-rods. The warp-threads are also led through openings in the drops or detectors I, made of thin strips or pieces of metal, various forms being shown in Figs. 16 to 24, inclusive. It will be noticed that in some of these the drops or detectors I are above and others below the warp, but all are constructed so as to embrace the support F and to be guided thereby when a warp-thread breaks or becomes unduly slack. As long as the drops are maintained in normal position by the warp-threads the longitudinal reciprocatory movement of the slide-bar $f^2$ will not be interrupted; but when a drop is released by breakage or undue slackness of a warp-thread it will fall into one of the serrations or notches $f^{10}$ in the slide-bar $f^2$, and through the movement of said bar the drop will be conducted to and allowed to fall into one of the serrations or notches $f'$ in the fixed support F, thereby arresting the longitudinal movement of the slide-bar and preventing it from traveling its full stroke. The cessation of the movement of the slide-bar is utilized to stop the loom or to actuate an indicator through the following means.

On the loom-frame A one or more brackets A' are adjustably mounted, and fulcrumed on said brackets are one or more oscillating feeler-levers $A^2$, each lever having at one end a pin or stud $A^3$, constituting the feeler proper, which feeler is adapted to pass through or enter holes $A^4$ in both the fixed support F and the slide-bar $f^2$. By reference to Fig. 3 it will be seen that one of the levers $A^2$ is terminated near its fulcrum and coupled with another lever $A^2$ by toothed quadrants or sectors J, by which the movement of one lever is transmitted to the other. This arrangement may be satisfactorily employed with two banks or groups of drops, each group having its reciprocating bar $f^2$. The feeler-levers $A^2$, or one of them, if there are two or more, has an extension connected with a rod $A^5$, which rod at its forward end is connected with one arm of a bell-crank lever $A^6$, the other arm of said lever constituting a dagger. The bell-crank lever $A^6$ is fulcrumed on the lay or other moving part of the loom, so as to be carried thereby, the dagger being adapted when moved a short distance in relation to the lay or going part of the loom to actuate the stopping or indicating mechanism.

As above stated, the fixed support F and the slide-bar $f^2$ are each provided near one end with openings $A^4$. During the normal operation of the loom and as the slide-bar $f^2$ is reciprocated these openings at one time during each reciprocation will coincide, and the mechanism described is so timed that upon each beat up of the lay the feeler-lever will be oscillated, causing thereby the pin $A^3$ to pass through the openings $A^4$ at the time when said openings register or are coincident. During the beat up of the lay under normal conditions the bell-crank lever $A^6$ swings with the lay and the dagger retains its normal position so as not to impinge upon the tappet $A^8$ on the shipper-lever. When, however, the movement of the slide-bar $f^2$ is arrested by the fall of a drop, the registration of the openings $A^4$ in said slide-bar and the fixed support F will be prevented, and as the feeler-lever $A^2$ is oscillated the pin $A^3$ will project into the opening of the fixed support F and impinge against the side of the slide-bar $f^2$. The effect of this is to arrest the movement of rod $A^5$; but as the lay continues its forward movement the tension of the spring $A^9$, mounted on the lay or going part of the loom and acting against the bell-crank lever $A^6$, will be overcome and said lever will be rocked on its fulcrum, so as to move the dagger into the position shown in dotted lines in Fig. 2 to thereby impinge upon the tappet $A^8$ during the completion of the forward stroke of the lay or going part of the loom to release the shipper-lever $A^7$ from its notch in the usual holding-place, and to thereby effect the stoppage of the loom in the usual and well-known manner.

Instead of the feeler-levers $A^2$ being actuated by toothed quadrants or sectors J they may be actuated by connecting rods or links J', as shown in Fig. 9, thereby enabling the invention to be used when more than two slide-bars are used at the same time.

In Figs. 7 and 8 I have shown a modification by which the slide-bar controls the movement of the feeler-levers $A^2$. In this construction in lieu of openings $A^4$ in the support F and the slide-bar $f^2$ a block $a$ is mounted on the bar $f^2$, said block being adapted to reciprocate with said bar, and so long as the latter is allowed to travel its full stroke the block $a$ will be carried beyond the path of the feeler-pins $A^3$, thereby allowing free play to the said pins to travel their full distance, which in this case terminates at or near the surface of the fixed support F. Should, however, the movement of the slide-bar $f^2$ be interrupted or limited by a fallen drop, as hereinbefore described, the block $a$ will come to a stationary position opposite the feeler-pins $A^3$, and thereby cause a movement of the dagger into position to impinge upon the stopping or indicating mechanism.

The tappet $A^8$ instead of being secured to the shipper-lever $A^7$ may be attached by means of a lever or rod K to a suitable indicator, such as K'. (Shown in Fig. 10.) When the dagger or free end of the bell-crank lever $A^6$ impinges upon the tappet $A^8$, which in this case is fastened to the rod K, said rod K will be caused to move on its pivot and indicate through the indicator when a drop has fallen by reason of the breakage or undue slackness of a warp-thread. After the broken thread has been repaired or the slack thread tightened and the drop moved to its normal position the indicating mechanism may be returned to its original position by the operator.

In the foregoing description the dagger is normally in such position as not to impinge upon the tappet $A^8$ and is moved into position to impinge thereon only when a warp-thread breaks or becomes unduly slack. It is equally feasible to so arrange the mechanism that the dagger will be moved out of position at each beat up of the lay so as not to impinge upon the tappet $A^8$ during the normal operation of the loom and allowed to remain in position when a warp-thread breaks or becomes unduly slack to either cause the loom to knock off or to set the indicator. This alternative method I have shown in Fig. 4, in which the dagger or free end of the bell-crank lever $A^6$ normally occupies the position shown in full lines, such position permitting the dagger to impinge upon the tappet $A^8$ at each beat up of the lay unless prevented by the coaction of the slide-bar $f^2$ and the feeler. In this construction the dagger is adapted to be actuated and moved a short distance in relation to the lay or going part during the normal running of the loom to prevent the knocking off of the loom and permitted to retain its normal position when a warp-thread breaks or becomes unduly slack so as to impinge upon the tappet $A^8$. This is effected by so arranging the slide-bar $f^2$ relative to its supporting-bar F that the openings $A^4$ will not register during the normal running of the loom and will only register through the limitation of the travel of the slide-bar $f^2$ by a fallen drop. Therefore at each beat up of the lay by reason of the openings $A^4$ not registering the feeler $A^3$ will impinge against the side of the slide-bar $f^2$, causing a slight oscillation of the bell-crank lever $A^6$ by overcoming the tension of the spring $A^9$, thereby causing the dagger or the forward end of said lever to assume the position shown in dotted lines, Fig. 4. When, however, a drop falls, the movement of slide-bar $f^2$ will be arrested, causing the openings $A^4$ to register and permitting the feeler to enter and pass through the openings in both the slide-bar and its support, thus completing its full stroke, no movement in relation to the lay or going part of the loom taking place. The dagger or free end of the lever $A^6$ will therefore remain in its normal position, (shown in full lines,) when it will impinge upon the tappet $A^8$ to actuate the stopping or indicating mechanism.

In the relative arrangement of the slide-bar $f^2$ and its support F described with reference to Fig. 1 the openings $A^4$ will register to permit the feeler $A^3$ on each beat-up of the lay to pass freely through said openings, the dagger being so positioned that it will always remain in its normal position out of the path of the tappet during the normal running of the loom. With reference to Fig. 4, the dagger is moved at each beat-up of the lay to escape the tappet and permit it to remain in its normal position only when a warp-thread breaks or becomes unduly slack.

In Figs. 5 and 6 the shipper-lever $A^7$ is shown as having mounted thereon a bracket $c$ and the tappet $A^8$ fulcrumed on said bracket in such manner as to be swung by the operator to the position shown in dotted lines out of the path of the dagger, as is sometimes required when starting the loom, at which moment there is sometimes a temporary slackening of the threads, or when for any other reason it is necessary to throw the stopping or indicating mechanism out of action. A spring $c'$ is adapted to hold the tappet $A^8$ in either position.

Referring to Fig. 11, I have shown the invention arranged behind the heddles or harness $a'$, and in which the utilization of one drop or detector I to be operated by more than one thread is shown. In such case the drops I are provided with a longer thread-hole than the other drops or detectors, through which hole is passed one or more threads H. By the action of the heddles $a'$ the threads H are successively raised and lowered to and from the top of the thread-aperture in the drop, it only being necessary for the proper operation of this arrangement to have each one of the threads singly at the top of the drop-aperture every few picks—that is to say, so long as the drops I are kept suspended above the supports F and slide-bars $f^2$ the stopping or indicating mechanism will not be actuated. When, however, one of the threads H comes to the top of the drop-aperture in a broken or abnormally slack condition, the drop will be allowed to fall sufficiently to set in motion the stopping or indicating mechanism, as hereinbefore described.

In Fig. 12 my invention is shown as applied more particularly to that class of looms for the weaving of pile fabrics, or looms wherein some of the threads are made to weave or float in very loosely, these excessively loose threads being supported by easing-rods $b^5$, which rods are adapted to take up the excessive slackness by a cam similar to that which operates the loom-heddles or the like. The rods $b^5$ are supported by springs $b^6$, which act as a cushion or easement for said rods. In this figure and also in Figs. 13 and 14 the support F and slide-bar $f^2$ are shown mounted and carried with the easing-rods.

Fig. 15 is a view similar to Fig. 12, differing only in that the supports F for the floating or pile threads are shown as rigidly secured to supports $I^{10}$ and not movable, as in Fig. 12.

In Figs. 13 and 14 the support F and easing-rods $b^5$ are shown as bolted to blocks $b^2$, of which there are two, one on each side of the loom, said blocks being mounted to slide vertically on guide-rods $b$. In order to maintain the proper relation between the feeler and the slide-bar $f^2$ no matter what may be the position of vertical adjustment of the support F, the slide-bar $f^2$ is formed with an extension $b'$, having a pin $b^4$, adapted to move in a longitudinal slot of a link $b^3$, the said link in turn having secured thereto a horizontal extension $b^{10}$, which extension carries the pin $f^3$, engaging the spring-forks $f$. The extension $b^{10}$ is also provided with an opening adapted to register with a similar opening in the fixed support $F^{10}$ of said extension, as shown in Figs. 26 and 27, said openings being similar to the openings $A^4$, previously described, and adapted to permit when registered a full movement of the feeler $A^3$. It is obvious that when the extension $b^{10}$ is reciprocated the link $b^3$ and the slide-bar $f^2$ will also be reciprocated, so that in whatever position the easing-rods may be the reciprocation of slide-bar $f^2$ will continue, and when a drop falls such reciprocatory movement will be arrested and the loom stopped in the same manner as before described with reference to Figs. 1, 2, and 4.

What I claim, and desire to secure by Letters Patent, is—

1. In a loom the combination of stopping or indicating mechanism, a bar, a feeler, means to normally move both said bar and feeler so that they shall impinge one upon the other at predetermined times, and a dagger controlled by said feeler so as to be moved from its normal position when said impingement occurs and to retain it at other times.

2. In a loom the combination with stopping or indicating mechanism of a dagger in normal position to act upon the said mechanism, a bar, a feeler controlling the movement of said dagger, means to produce a relative movement between said bar and feeler so that they shall impinge one upon the other at predetermined times during the normal running of the loom to thereby displace said dagger from its normal position.

3. In a loom the combination of stopping or indicating mechanism, a bar, a feeler, means to produce a relative movement between said bar and feeler so that they shall impinge one upon the other at predetermined times during the normal running of the loom, and means comprising drop devices to arrest said relative movement to permit of an uninterrupted movement of said feeler when a warp-thread breaks or becomes unduly slack.

4. In a loom the combination of stopping or indicating mechanism, a dagger in normal position to act upon said mechanism, a bar, a feeler controlling the movement of said dagger, means to produce a relative movement between said bar and feeler so that they shall impinge one upon the other at predetermined times during the normal running of the loom to thereby displace said dagger from its normal position, and means to arrest said movement when a warp-thread breaks or becomes unduly slack to thereby permit of an uninterrupted movement of said feeler and the dagger to retain its normal position.

5. In a loom the combination of stopping or indicating mechanism, a bar, a feeler, means to produce a relative movement between said bar and feeler so that they shall impinge one upon the other at predetermined times during the normal running of the loom, a dagger and means connecting the same to said feeler so that the dagger will be moved thereby at the time of said impingement, and drops controlled by the warp-threads to arrest said relative movement when a warp-thread breaks or becomes unduly slack to permit of an uninterrupted movement of said feeler and of the dagger to retain its normal position.

6. In a warp stop-motion for looms the combination of a bar, a feeler, means to produce a relative movement between said bar and feeler so that during the normal running of the loom the said parts will impinge one upon the other, means to arrest said movement when a warp-thread breaks or becomes unduly slack to prevent such impingement, and stopping or indicating mechanism controlled by or through the feeler.

7. In a warp stop-motion for looms the combination of an apertured bar, a feeler, means to produce a relative movement between said bar and feeler so that during the normal running of the loom the feeler will impinge against said bar, means to arrest said movement when a warp-thread breaks or becomes unduly slack to permit of an uninterrupted movement of said feeler, and stopping or indicating mechanism controlled by or through the feeler.

8. In a warp stop-motion for looms the combination of an apertured bar, a feeler and means to actuate the same, means to move said bar so that said feeler shall impinge upon it during the normal running of the loom, and means when a warp-thread breaks or becomes unduly slack to arrest the movement of said bar to permit of an uninterrupted movement of said feeler, and stopping or indicating mechanism controlled by or through the feeler.

9. In a warp stop-motion for looms the combination of an apertured bar and means to reciprocate the same, drops normally suspended above said bar and adapted upon the breakage or undue slackening of a warp-thread to arrest the movement of said bar, a feeler adapted to impinge against said bar during the normal running of the loom and to pass into said aperture when the movement of said bar is arrested, and stopping or indicating mechanism controlled by or through the feeler.

10. In a loom the combination of stopping or indicating mechanism, a bar and means to reciprocate the same, said bar being adapted to be moved vertically with the moving warps, means to arrest the reciprocating movement of said bar when a warp-thread breaks or becomes unduly slack, and means to actuate the stopping or indicating mechanism when such reciprocating movement is arrested.

In witness whereof I have hereunto signed my name, this 13th day of May, 1903, in the presence of two subscribing witnesses.

WM. H. BAKER.

Witnesses:
   H. I. SHOOBRIDGE,
   FRED. B. EVANS.